3,284,465
NITROPHENYLIMINO DERIVATIVES OF
PYRROLIDINE AND PIPERIDINE
Daniel A. Scola, Andover, Mass., assignor to Monsanto Research Corporation, St. Louis, Mo., a corporation of Delaware
No Drawing. Filed Feb. 24, 1964, Ser. No. 347,030
5 Claims. (Cl. 260—326.85)

This invention relates to new compounds, and more particularly, provides novel nitro-aromatic compounds.

In accordance with this invention, novel nitro-aromatic compounds are provided which are of the formula

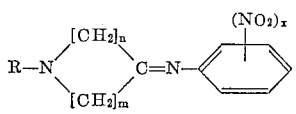

in which $n$ and $m$ are each integers of from 0 to 5, the sum of $m$ and $n$ is from 3 to 5, $x$ is an integer of from 1 to 2, and R is a substituent selected from the class consisting of H and saturated hydrocarbon radicals of from 1 to 6 carbon atoms, which is alkyl when one of $m$ and $n=0$.

The stated novel nitro-aromatic compounds are stable, generally solid materials which are useful for a variety of purposes. They may be used as agricultural toxicants, for example, as insecticides. The compounds of this invention can also be used as oil additives, particularly to improve the oxidation resistance of lubricant fluids; as cathode depolarizers in primary voltaic cells, and so forth. The presently provided compounds having a 6-membered ring are particularly useful as intermediates for the synthesis of anti-allergens such as N-benzylanilinopiperidines. Compounds of the invention having 5-membered rings, which are free of skin irritation properties, are of particular utility as general anesthetics.

The compounds of this invention include, for example,
2-(4-nitrophenylimino)pyrrolidine,
2-(2-nitrophenylimino)piperidine,
2-(3-nitrophenylimino)hexamethylenimine,
2-(2-nitrophenylimino)pyrrolidine,
2-(2-,4-dinitrophenylimino)pyrrolidine,
2-(3,4-dinitrophenylimino)pyrrolidine,
2-(2,4-dinitrophenylimino)piperidine,
2-(3,5-dinitrophenylimino)piperidine,
2-(2,4-dinitrophenylimino)hexamethylenimine,
1-methyl-2-(4-nitrophenylimino)pyrrolidine,
1-ethyl-2-(4-nitrophenylimino)pyrrolidine,
1-butyl-2-(3-nitrophenylimino)pyrrolidine,
1-cyclopentyl-2-(4-nitrophenylimino)pyrrolidine,
1-hexyl-3-(2,4-dinitrophenylimino)pyrrolidine,
1-propyl-2-(4-nitrophenylimino)pyrrolidine,
1-isopropyl-4-(4-nitrophenylimino)piperidine,
1-isobutyl-2-(3,4-dinitrophenylimino)piperidine,
1-amyl-2-(4-nitrophenylimino)piperidine,
1-methyl-4-(4-nitrophenylimino)piperidine,
1-ethyl-3-(3-nitrophenylimino)piperidine,
1-cyclohexyl-3-(4-nitrophenylimino)piperidine,
1-methyl-2-(2-nitrophenylimino)hexamethylenimine,
1-t-butyl-2-(2-nitrophenylimino)hexamethylenimine,
1-isopropyl-4-(4-nitrophenylimino)hexamethylenimine,
1-isopropyl-4(2,4-dinitrophenylimino)hexamethylenimine
and the like. The 2-imino compounds (in which the integer $m$ in the above formula is 0), and particularly, the 2-imino pyrrolidines are especially preferred.

The above-identified compounds may be prepared by reaction of the corresponding N-heterocyclic ketone with a mononitro- or dinitroaniline, the amine and ketone reactants condensing with the elimination of water as represented by the following equation:

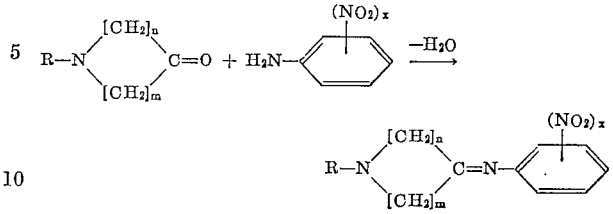

where $n$, $m$, $x$ and R are as defined above.

In conducting the reaction to form the desired imine, equimolar amounts of the ketone and the amine are consumed. However, either the ketone or the amine reactant may be present in excess, if desired; ratios of the one to the other may range, for example, from 5:1 to 1:5, on a molar basis. Generally, the amine and ketone are contacted in the presence of a condensation catalyst. This may be an acid, such as a weak acid like glacial acetic acid, for example. Conveniently, especially in the reaction of lactams—ketones of the above formula where $m=0$—the catalyst is a compound which forms a complex with the lactam, such as phosphorus oxychloride or benzenesulfonic acid. Phosphorus oxychloride is an especially preferred catalyst. The amount of phosphorus oxychloride present is desirably about equivalent, on a molar basis, to the amount of the aromatic nitro-substituted amine employed. The compounds are preferably contacted in solution. Exemplary of suitable solvents and diluents are hydrocarbons such as benzene, toluene, and the like. The temperature of reaction may range from below room temperature, down to say, 0° C., up to elevated temperatures such as up to 150° C.; preferably, temperatures employed for moderate reaction rates are in the range between 50° and 150° C. Pressures may also vary, from sub-atmospheric, down to say 0.5 mm. Hg, up to super-atmospheric pressures, such as 5000 p.s.i.; usually ordinary atmospheric pressures are suitable. Time of reaction will depend on temperature, pressure and the like; as the reaction proceeds, water is evolved by condensation of the amine and the ketone, and generally the reaction will be continued until the evolution of water ceases. On completion of the reaction, extraction, recrystallization, distillation or the like procedures are employed to isolate the reaction product.

The invention is illustrated but not limited by the following examples:

*Example 1*

This example illustrates preparation of a nitroaromatic compound in accordance with the present invention.

A solution of 100 grams (g.) (about 1 mole) of 1-methyl-2-pyrrolidone in benzene is stirred while a benzene solution of 76.7 g. (0.5 mole) of phosphorus oxychloride is slowly added. Then 64 g. (about 0.5 mole) of 4-nitroaniline in benzene solution is introduced, and the reaction mixture is heated to reflux. Reflux is continued overnight, and on the following day the reaction mixture is allowed to cool to room temperature. The supernatant benzene layer is decanted and the lower layer, after washing with benzene, is dissolved in water, and made alkaline with 2 N NaOH. The alkaline mixture is extracted with benzene again, and the benzene extract is dried over anhydrous sodium sulfate, distilled to remove benzene and vacuum distilled to remove unreacted amine. The oily residue crystallizes to a yellow solid, weighing 76 g. after drying, and melting at 63–64° C. The infrared analysis of the product is consistent with the assigned structure, 1-methyl-2-(4-nitrophenylimino)pyrrolidine, as is the elemental analysis:

Calcd. for $C_{11}H_{13}N_3O_2$: C, 60.3; H, 6.0; N, 19.2. Found: C, 60.8; H, 6.0; N, 19.3.

Proceeding similarly, employing 3,5-dinitroaniline and 4-piperidone, reacted in the presence of phosphorus oxychloride, the product is 4-(3,5-dinitrophenylimino)piperidine.

*Example 2*

This example illustrates application of a compound in accordance with the invention as an insecticide.

A sample of 1-methyl-2-(4-nitrophenylimino)pyrrolidine is dissolved in acetone to provide a solution concentration of 30 g. of the chemical per liter. Three adult plum curculio (*Conotrachelus nenuphar*) are anesthetized with carbon dioxide and then 1 microliter of the solution of the pyrrolidine compound is applied to the abdomen of each. The treated curculio are held at room temperature in a chamber provided with food. It is found that application of the pyrrolidine compound kills the curculio organisms within 48 hours.

*Example 3*

This example illustrates use of a compound of this invention as a general anesthetic.

A solution is prepared of 1-methyl-2-(4-nitrophenylimino)pyrrolidine by dissolving 35.8 milligrams of the compound in 3.54 cubic centimeters of polyethylene glycol (molecular weight 200). This is diluted with more polyethylene glycol to provide a solution which is injected in mice at a rate of 1.00 milliliter per kilogram, to provide a concentration of the pyrrolidine compound of 10.0 milligrams per kilogram. In three minutes, the mice exhibit loss of the escape response and hyposensitivity to sound. In 15 minutes, a slow deep respiratory pattern appears. Recovery is complete within two hours.

Suspensions containing 10% and 1%, respectively of the pyrrolidine in polyethylene glycol are prepared and 0.1 ml. of each is applied to the bare skin of live rabbits. The animals are observed for erythema, blanching, edema and tissue damage: in no case is any evidence of any such skin irritation observed.

While the invention has been described with particular reference to specific preferred embodiments, it is to be appreciated that modifications and variations can be made without departing from the scope of the invention, which is limited only as defined in the following claims.

What is claimed is:

1. A nitrophenylimino derivation of a member selected from the class consisting of pyrrolidine and piperidine having the formula

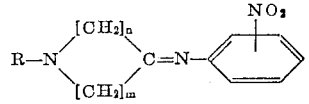

in which $n$ and $m$ are integers of from 0 to 4, the sum of $n$ and $m$ is from 3 to 4, and R is an unsubstituted saturated hydrocarbon alkyl radical of from 1 to 6 carbon atoms.

2. The compounds of claim 1 in which said integer $m$ is 0 and said integer $n$ is an integer of from 3 to 4.

3. The compounds of claim 2 in which said integer $n$ is 3.

4. The compounds of claim 2 in which said integer $n$ is 4.

5. 1-methyl-2-(4-nitrophenylimino)pyrrolidine.

References Cited by the Examiner

UNITED STATES PATENTS 3,192,219  6/1965  Maddox et al. ____ 260—239 X

FOREIGN PATENTS 913,932  12/1962  Great Britain.

OTHER REFERENCES

Chemical Abstracts, Volume 53, par. 11215c, 1959, Call No. QD1–A51. (Abstract of Pilt et al., *Unkrain. Khim. Zhur.*, Vol. 24, pages 467–471, 1958).

ALEX MAZEL, *Primary Examiner.*

HENRY R. JILES, *Examiner.*

MARY U. O'BRIEN, *Assistant Examiner.*